(12) United States Patent
Reck (10) Patent No.: US 6,779,561 B2
(45) Date of Patent: *Aug. 24, 2004

(54) SINGLE FLANGED END BALL VALVE OF UNITARY CONSTRUCTION

(76) Inventor: Michael E. Reck, 15 Pearl St., Belmont, MA (US) 02478

( * ) Notice: Subject to any disclaimer, the term of this patent is extended or adjusted under 35 U.S.C. 154(b) by 0 days.

This patent is subject to a terminal disclaimer.

(21) Appl. No.: 10/698,164

(22) Filed: Oct. 31, 2003

(65) Prior Publication Data

US 2004/0089356 A1 May 13, 2004

Related U.S. Application Data

(63) Continuation of application No. 10/097,762, filed on Mar. 14, 2002, now Pat. No. 6,655,412.
(60) Provisional application No. 60/300,345, filed on Jun. 22, 2001, and provisional application No. 60/300,622, filed on Jun. 25, 2001.

(51) Int. Cl.[7] ............................................. F16K 11/22
(52) U.S. Cl. ................................. 137/883; 251/315.14
(58) Field of Search ................................ 137/883, 596, 137/887; 251/315.14

(56) References Cited

U.S. PATENT DOCUMENTS

| | | | |
|---|---|---|---|
| 1,350,362 A | | 8/1920 | Decker ........................ 137/596 |
| 3,473,554 A | * | 10/1969 | King ........................... 137/312 |
| 3,591,131 A | | 7/1971 | Carlson ........................ 251/144 |
| 3,674,052 A | | 7/1972 | Hartman et al. ........ 137/625.21 |
| 3,770,016 A | * | 11/1973 | Johnstone et al. ...... 137/625.22 |
| 4,089,345 A | | 5/1978 | Eberhardt ................ 137/596.2 |
| 4,103,868 A | | 8/1978 | Thompson ................... 251/283 |
| 4,206,904 A | | 6/1980 | Dante ..................... 251/315.08 |
| 4,342,444 A | | 8/1982 | Sonderman ............ 251/315.14 |
| 4,718,444 A | * | 1/1988 | Boelte ......................... 137/15 |
| 5,551,479 A | * | 9/1996 | Graves ..................... 137/614.2 |
| 5,632,300 A | | 5/1997 | Isringhausen ................ 137/269 |
| 5,857,717 A | | 1/1999 | Caffrey ..................... 285/289.1 |
| 6,296,229 B1 | | 10/2001 | Giacomini .................. 251/314 |

* cited by examiner

*Primary Examiner*—John Fox (57) ABSTRACT

A ball valve unit for shutting off the flow of fluids flowing in heating and plumbing systems. The ball valve unit includes a ball valve and a main section including a flange formed integrally with the main section. A chamber is formed in the main section for receiving the ball of the ball valve. The main section is made of brass in order to prevent galvanic action between ball valve unit and the heating/plumbing system.

9 Claims, 8 Drawing Sheets

SINGLE FLANGED END BALL VALVE OF UNITARY CONSTRUCTION

CROSS REFERENCE TO RELATED APPLICATIONS

This Patent Application is a Continuation of application Ser. No. 10/097,762, filed Mar. 14, 2002 now U.S. Pat. No. 6,655,412 which claims priority from U.S. Provisional Patent Application Ser. No. 60/300,345, filed on Jun. 22, 2001 and U.S. Provisional Patent Application Ser. No. 60/300,622, filed on Jun. 25, 2001, the contents of which are incorporated herein by reference in its entirety.

BACKGROUND

This invention relates generally to ball valves, and more particularly to a flanged end ball valve of unitary construction.

Figure 1:
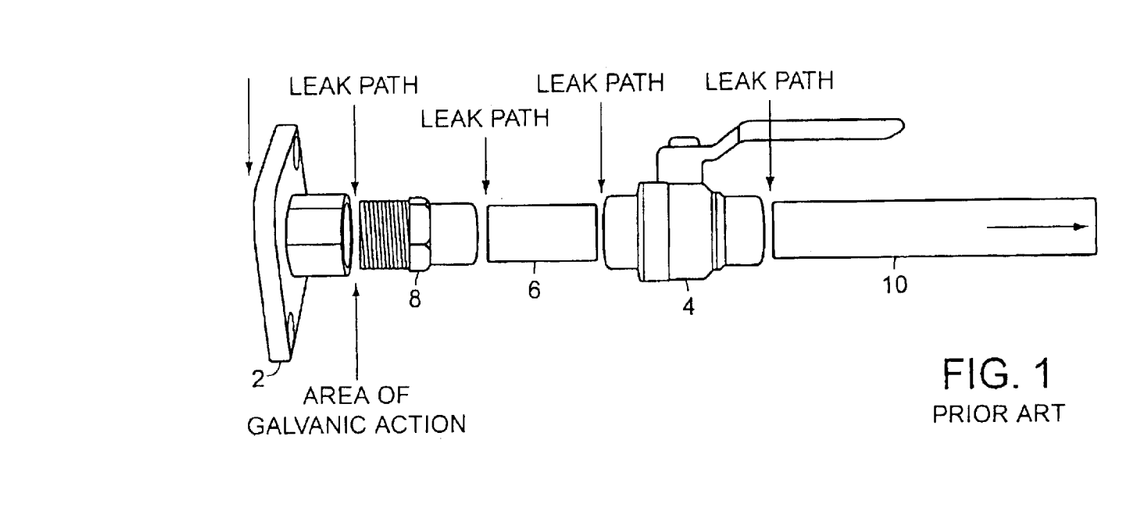
FIG. 1 shows a first conventional system.

Traditionally, a ball valve is used in plumbing and heating applications to shut off the flow of water or other fluid during replacement or repair of an in-line appliance or piece of equipment, such as a circulating pump. As shown in FIG. 1, typically, a ball valve used in a plumbing and heating application includes a separate flange 2, a conventional ball valve 4, and a copper nipple 6 and copper adapter 8 that connect the flange 2 to the conventional ball valve 4. The ball valve 4 is attached to the plumbing or heating system with copper tubing 10. The in-line appliance (not shown) is attached to the flange 2. Alternatively, an iron nipple 12 has been used to connect the flange 2 to the ball valve 4, and a copper adapter 14 has been used to connect the ball valve 4 to the copper tubing 10, as shown in FIG. 2.

Figure 2:
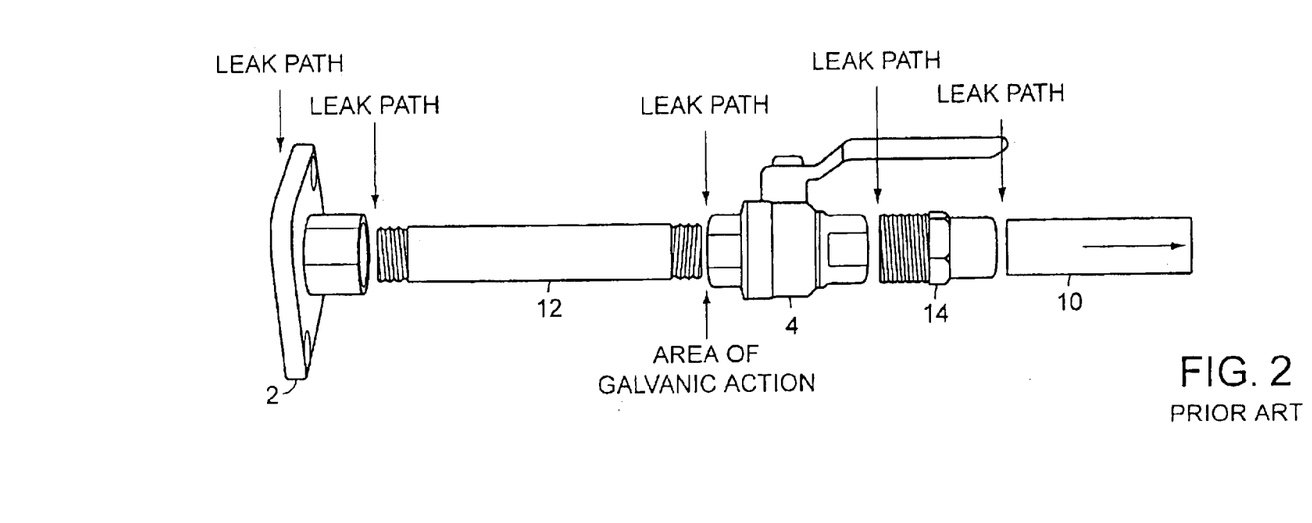
FIG. 2 shows a second conventional system.

As shown in FIGS. 1 and 2, in the conventional methods, there are several potential leak paths. Also, there are areas of galvanic action between dissimilar metals. Further, installation of the flange, the nipples, and the adapters in this type of configuration is time consuming and expensive.

Figures 3, 4:
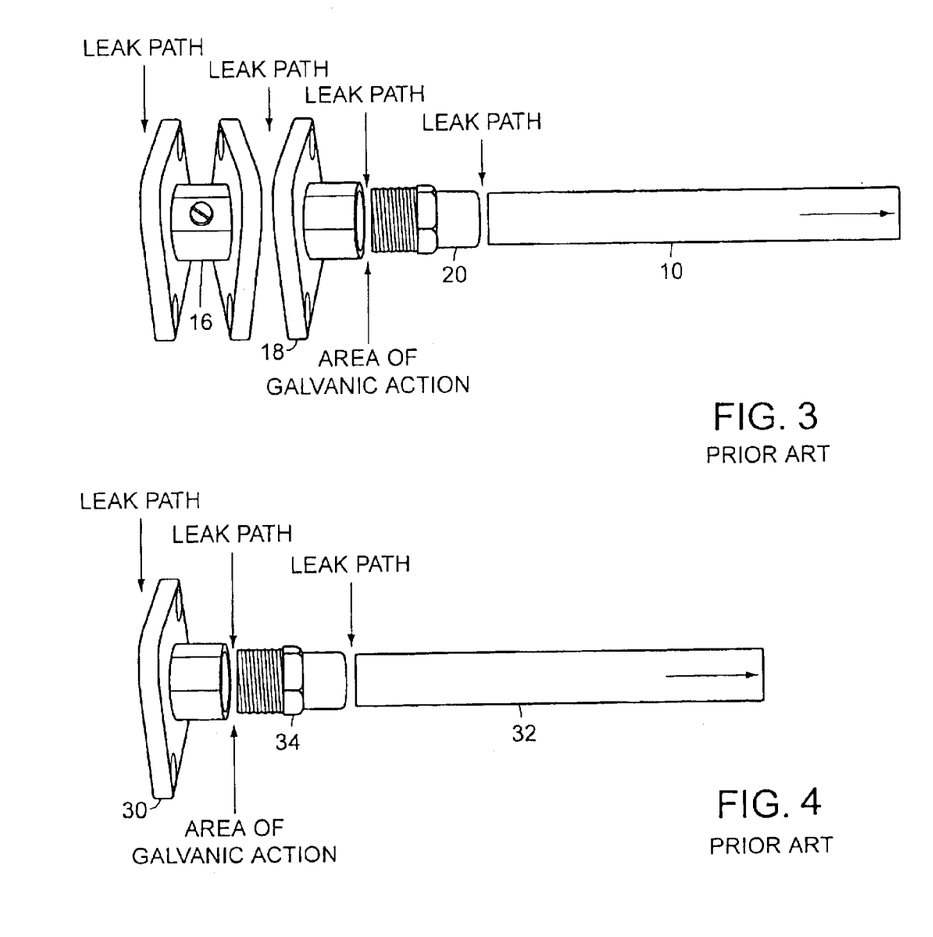
FIG. 3 shows a third conventional system.
FIG. 4 shows a fourth conventional system.

The conventional method shown in FIG. 3 includes an iron flange 16 that includes a screwdriver slot ball valve. The flange 16 is connected to a second iron flange 18. A copper adapter 20 connects the iron flange 18 to copper tubing 10. In this configuration, since the flange 18 is made of iron, there is an area of galvanic action between the iron flange 18 and the copper adapter 20. Also, there are several potential leak paths. Further, this configuration is complex, which increases the cost and installation time.

FIG. 4 shows another conventional configuration. This configuration includes an iron flange 30 connected to a copper tube 32 via a copper adapter 34. In this conventional configuration, it is not possible to isolate an in-line appliance, thereby making repair and replacement of the in-line appliance burdensome. Also, there are several potential leak paths. Further, there are areas of galvanic action between the copper adapter 34 and the iron flange 30.

SUMMARY OF THE INVENTION

The present invention provides a ball valve unit that reduces the cost and time required to replace in-line appliances such as pumps.

The ball valve unit of the present invention also reduces the number of joints and flanges, thereby reducing the volume of the plumbing system and the number of leakage paths.

Further, the present invention also provides a ball valve unit that prevents the cracking of brittle iron flanges and prevents galvanic action.

The present invention comprises a main section, a flange for connecting the ball valve unit to an appliance, wherein the flange is integrally formed with the main section, a ball valve, a chamber formed in the main section for accommodating the ball of the ball valve, and a handle for actuating the ball valve.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION OF THE INVENTION

Figure 5A:
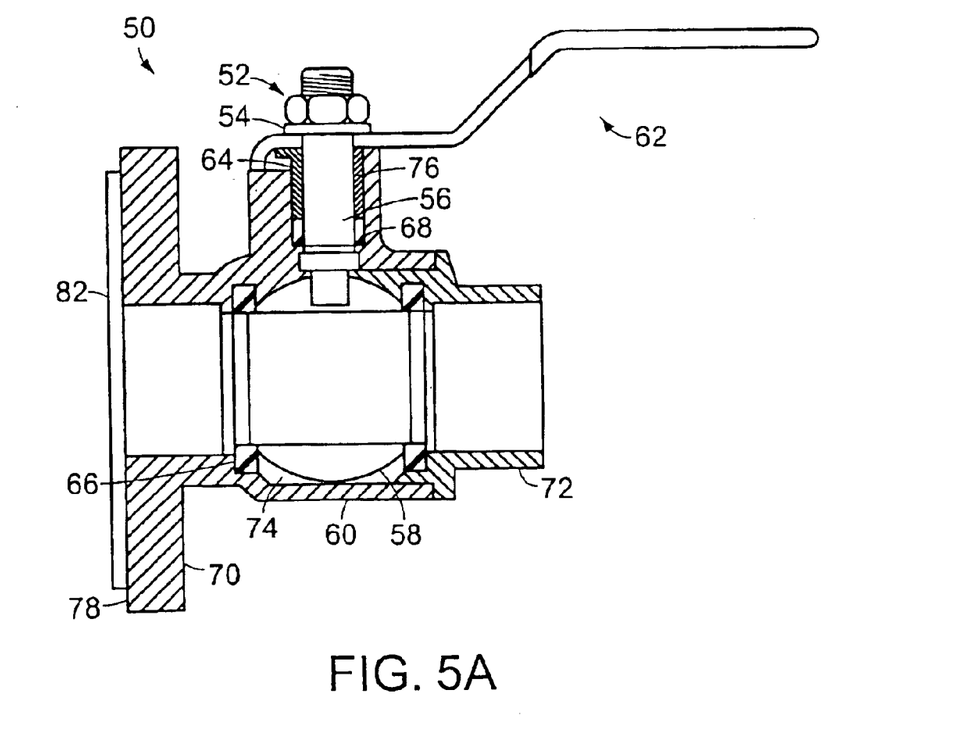
FIGS. 5A and 5B show cross-sectional views of one embodiment of the ball valve unit of the present invention.
Figure 5B:
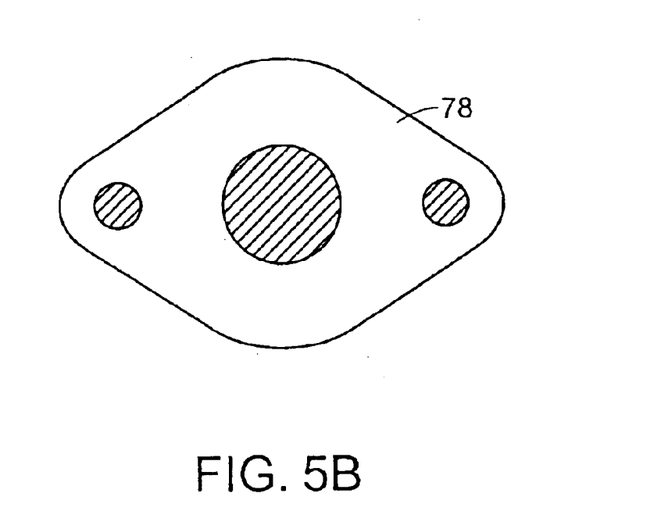

FIG. 5A shows a cross-sectional view of one embodiment of the present invention. As shown in FIG. 5A, the single flanged ball valve unit, according to the present invention, is designated by reference number 50. It comprises a handle nut 52, a washer 54, a stem 56, a ball 58, a body 60, a handle 62, a packing gland 64, seats 66, and a stem seal 68. The body 60 comprises a main section 70 and an end cap 72. The main section 70 includes a chamber 74 adapted to accommodate the ball 58 and seats 66, a stem hole 76 to receive the stem 56 and stem seal 68, and a flange 78 to be positioned juxtaposed an inline appliance or equipment, such as a circulating pump (not shown). The ball valve unit 50, preferably, is 600 PSI rated for use with water, oil or gas. The inner diameter of the chamber 74 is substantially equal to the inner diameter of the end cap 72, thereby maximizing flow through the ball valve unit. FIG. 5B shows a side view of the flange 78.

The main section 70 and flange 78 are of unitary constriction and preferably made from cast or hot forged brass. Since plumbing and heating systems typically comprise brass or copper tubing, this prevents the occurrence of electrolysis and galvanic action at the junction of the ball valve unit and the system tubing. Also, brass is a much softer alloy than traditional iron used for the flanges currently on the market that often crack when slightly over tightened.

The ball 58 is preferably made of Brass/Hard Chrome Plate and fits between seats 66, preferably made from Teflon® or PTFE. The ball 58 is actuated with a blow-out proof stem 56 preferably made of Brass (ASTM B124-C37700). The ball 58 is actuated with a handle 62, preferably made of stamped steel with a vinyl coating.

The stem 56 is sealed with a stem seal 68, preferably made from Teflon® or PTFE, and an adjustable packing gland 64, preferably Brass (ASTM B124-C37700).

The end cap 72, preferably Brass (ASTM B124-C37700), is a threaded NPT (National Pipe Thread) connection, a Sweat (copper tubing) connection or a PEX (Cross Link Polyethylene) connection. The end cap 72 can be of varying sizes such as ½", ¾", 1", 1¼", 1½" and 2". The end cap 72 can be an (NPT) ANSI BI.20.1 threaded end (½"-2"), an ANSI B16.18 solder end (½"-2"), or a PEX insert end (½"-1").

When the ball valve unit is installed, the flange 78 is bolted to, for example, an iron flange that is part of a circulating pump (not shown). A rubber gasket 82 (preferably made of neoprene) forms the seal between the two flanges. The rubber gasket can be part of the flange 78 or the pump. The gasket stops two unlike metals from touching each other, thus eliminating galvanic action. Preferably, the flange 78 is substantially flat so that it will fit different size appliances. The flange 78 is consistent in size to fit most manufacturers smaller sized circulating pumps. A preferred length and thickness of the flange is 4⅛" and ⅜", respectively.

Figure 6A:
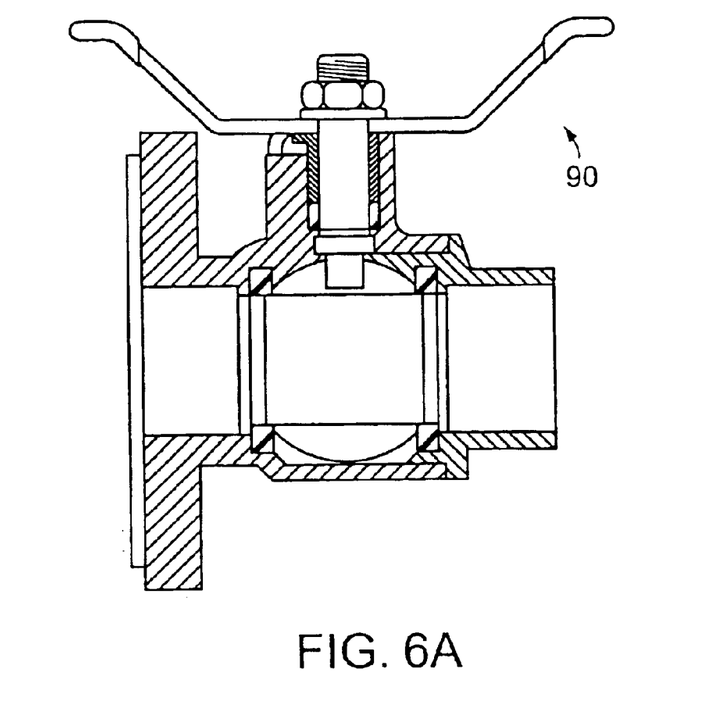
FIGS. 6A and 6B show cross-section views of a second embodiment of the ball valve unit of the present invention.
Figure 6B:
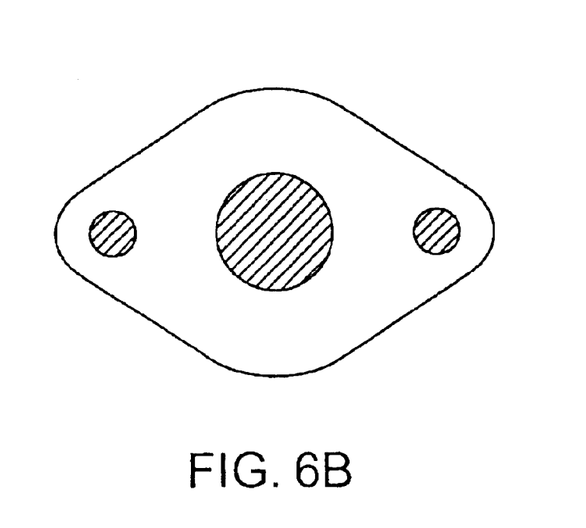

FIG. 6A shows a cross-section of a second embodiment of the ball valve unit of the present invention. The second embodiment is substantially similar to the first embodiment. As shown in FIG. 6A, the second embodiment includes a wing-shaped handle 90 to allow for easy actuation of the valve. FIG. 6B shows a side view of the flange 78.

Figure 7A:
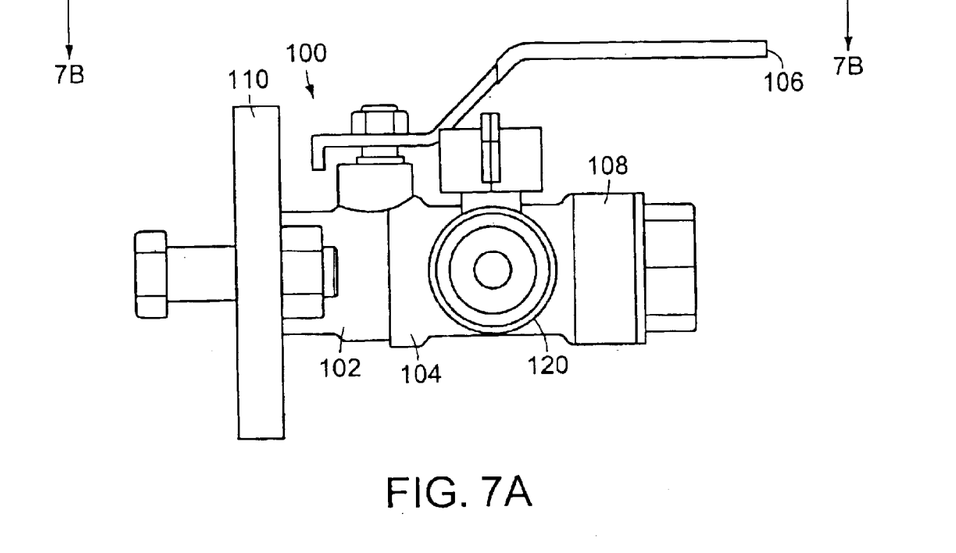
FIGS. 7A and 7B show a third embodiment of the ball valve unit of the present invention.
Figure 7B:
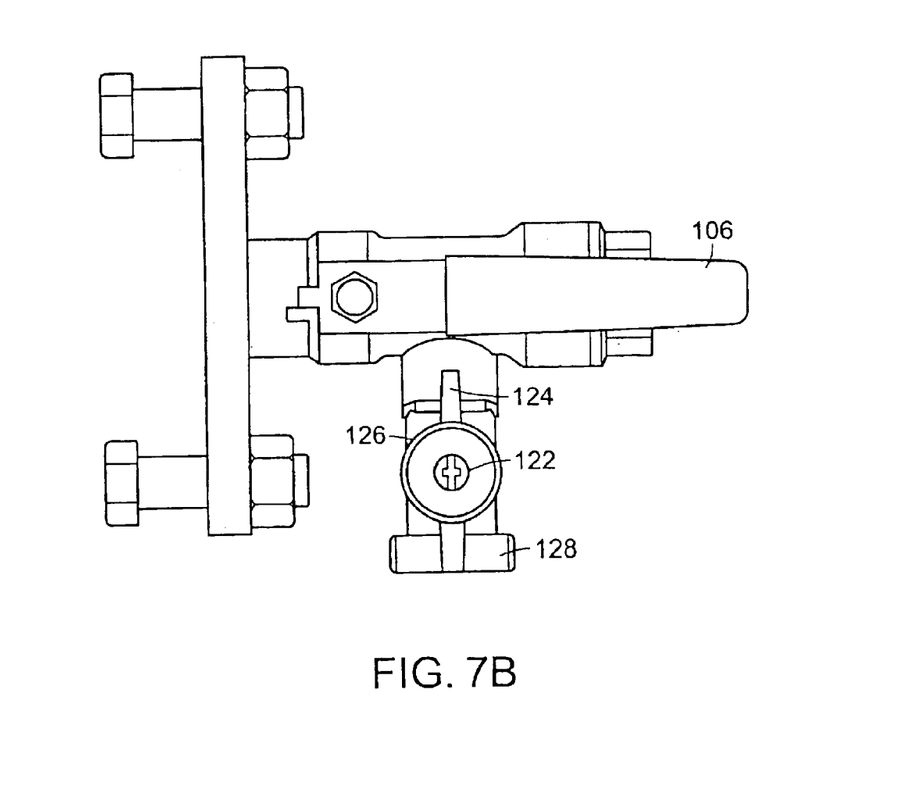

FIGS. 7A and 7B show a third embodiment of the ball valve unit of the present invention. As shown in FIG. 7A, the ball valve unit 100 includes similar components as the ball valve unit 50 of the first embodiment. Specifically, the ball valve unit 100 comprises, inter alia, ball valve 102, main section 104, handle 106, end cap 108, and flange 110. In addition, the ball 7 valve unit 100 includes a drain valve 120. The drain valve 120 is used to drain the system in the vicinity of the ball valve 102. The drain valve 120 comprises a ball valve 122 that is actuated by a handle 124. The ball valve 122 is housed in extension tubing 126 that is fitted to the main section 104 of the ball valve unit 100. A hose (not shown) can be attached to the extension tubing for draining the system. The extension tubing 126 preferably is made from cast or hot forged brass.

Figure 8A:
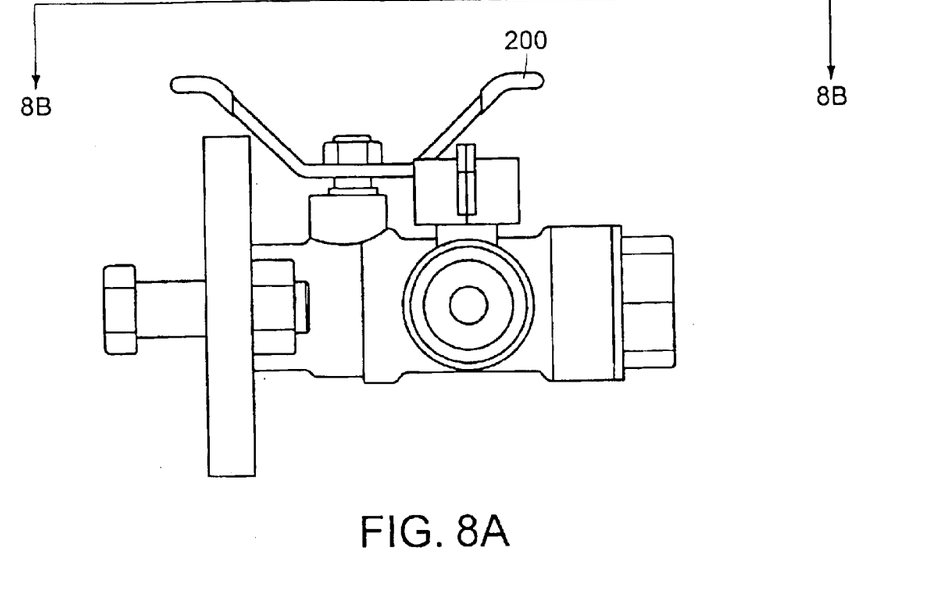
FIGS. 8A and 8B show a fourth embodiment of the ball valve unit of the present invention.
Figure 8B:
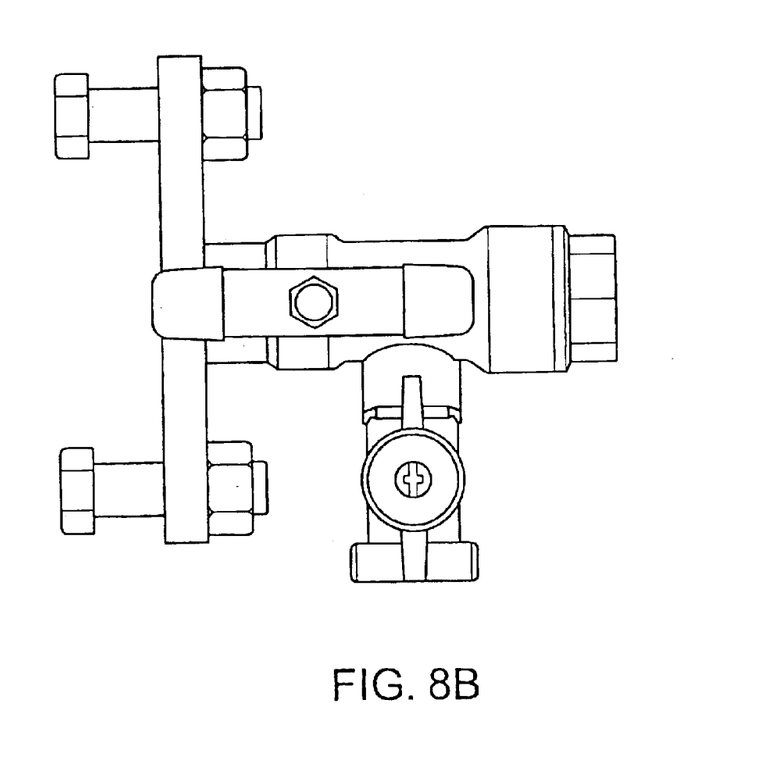

FIGS. 8A and 8B show a fourth embodiment of the ball valve unit of the present invention. The fourth embodiment is substantially similar to the third embodiment and includes a wing-shaped handle 200, as shown in FIGS. 8A and 8B.

Figure 9A:
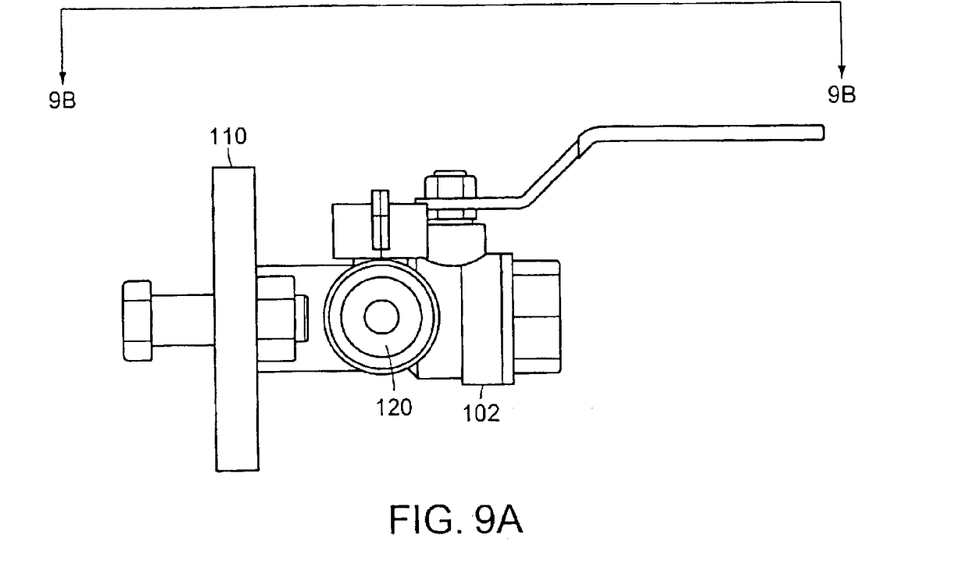
FIGS. 9A and 9B show a fifth embodiment of the ball valve unit of the present invention.
Figure 9B:
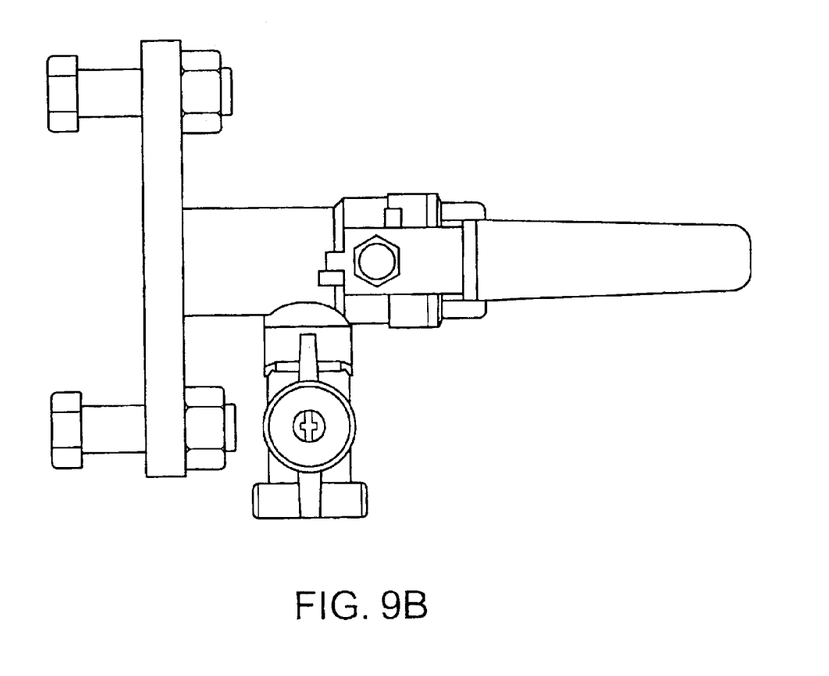

FIGS. 9A and 9B show a fifth embodiment of the ball valve unit of the present invention. The fifth embodiment is substantially similar to the third embodiment. In the fifth embodiment, the drain valve 120 positioned between the flange 110 and ball valve 102, as shown in FIGS. 9A and 9B.

Figure 10A:
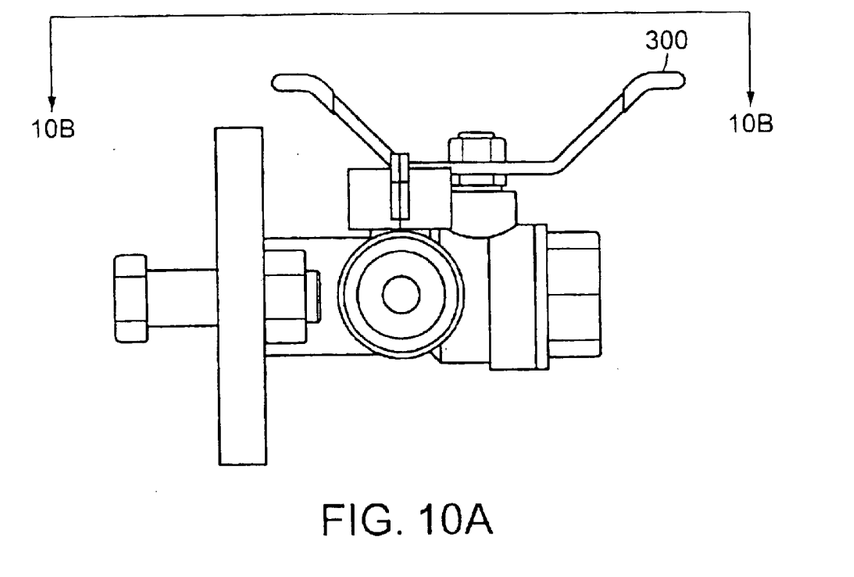
FIGS. 10A and 10B show a sixth embodiment of the ball valve unit of the present invention.
Figure 10B:
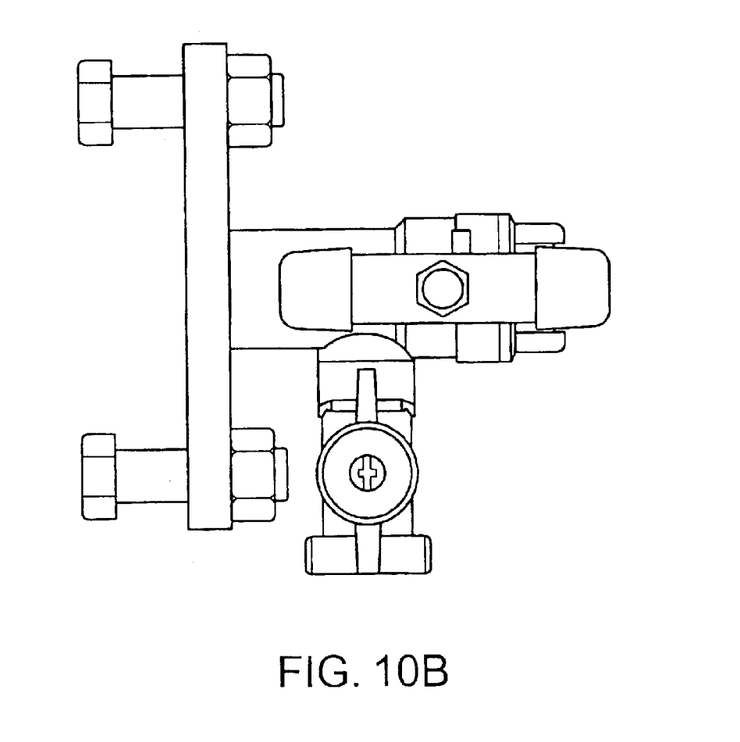

FIGS. 10A and 10B show a sixth embodiment of the ball valve unit of the present invention. The sixth embodiment is substantially similar to the fifth embodiment and includes a wing-shaped handle 300.

The present invention, without the addition of any additional components, can be used to quickly and easily replace plumbing components and appliances such as pumps. The appliance can be changed by simply closing the ball valves and loosening bolts in the flanges on each side of the appliance. The appliance will then drop out and a new one can be placed back in, thereby minimizing installation problems.

Further, because the ball valve is formed integral with the flange, the number of joints is reduced, thereby reducing the volume of the system and the number of leak paths.

Although the invention has been described with respect to various embodiments, it should be realized this invention is also capable of a wide variety of further and other embodiments. For example, the handle 62, 90, 106, 200, 300 can be a different type than those shown in FIGS. 5A–10B. In addition to brass, the body 60 and main section 70 can be made of any material that reduces galvanic action, for example, copper, PVC, or bronze. Also, in the embodiments shown in FIGS. 7A–10B, a bleeder valve can be used in addition to, or in place of, the drain valve.

What is claimed is:

1. A ball valve unit comprising:

a ball section, said ball section defining a stem chamber and a ball chamber, said stem chamber disposed adjacent to and extending outwardly from said ball chamber;

a ball valve including a ball, said ball disposed completely within said ball chamber;

a stem disposed within and extending outwardly from said stem chamber and connected to said ball disposed within said ball chamber, an exposed portion of said stem extending beyond said stem chamber;

a handle connected to said exposed portion of said stem disposed within said stem chamber and connected to said ball, wherein actuation of said handle effects actuation of said ball for operating said ball valve unit;

a main section;

a drain valve communicating with at least one of the ball section and said main section; and a flange formed as a continuous portion of at least one of said main section and said ball section, said ball section including said stem chamber and said ball chamber, wherein said flange, said main section and said ball section including said stem chamber and said ball chamber being formed as a single piece formed of a rigid material.

2. The ball valve unit of claim 1, wherein said ball valve unit further includes a gasket disposed adjacent to said flange for forming a seal between said flange and an appliance.

3. The ball valve unit of claim 1, wherein said main section and said ball section are made of brass.

4. The ball valve unit of claim 1, further including an end cap attached to at least one of said main section and said ball section.

5. The ball valve unit of claim 4, wherein said main section and said end cap are made of brass.

6. The ball valve unit of claim 1, wherein an outside surface of said flange is substantially flat.

7. The ball valve unit of claim 1, wherein said handle is wing-shaped.

8. The ball valve unit of claim 4, wherein an inner diameter of said chamber is substantially equal to an inner diameter of said end cap.

9. A ball valve unit of claim 1, wherein said drain valve is disposed between said flange and said ball valve.

* * * * *